US012633263B2

(12) United States Patent
Oh et al.

(10) Patent No.: US 12,633,263 B2
(45) Date of Patent: May 19, 2026

(54) GAMMA VOLTAGE GENERATION CIRCUIT AND DISPLAY DEVICE INCLUDING SAME

(71) Applicant: LG DISPLAY CO., LTD., Seoul (KR)

(72) Inventors: Dae Seok Oh, Paju-si (KR); Ji Ho Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/897,784

(22) Filed: Sep. 26, 2024

(65) Prior Publication Data

US 2025/0218402 A1 Jul. 3, 2025

(30) Foreign Application Priority Data

Dec. 28, 2023 (KR) ........................ 10-2023-0195313

(51) Int. Cl.
*G09G 3/3291* (2016.01)

(52) U.S. Cl.
CPC ... *G09G 3/3291* (2013.01); *G09G 2310/0291* (2013.01); *G09G 2330/028* (2013.01)

(58) Field of Classification Search
None
See application file for complete search history.

(56) References Cited

U.S. PATENT DOCUMENTS

2008/0291190 A1* 11/2008 Kim ..................... G09G 3/3648 345/211
2016/0118000 A1* 4/2016 Kim ..................... G09G 3/3696 345/99

FOREIGN PATENT DOCUMENTS

KR 10-2010-0006035 A 1/2010
KR 10-2012-0052535 A 5/2012
KR 10-2020-0052144 A 5/2020

* cited by examiner

*Primary Examiner* — Ifedayo B Iluyomade
(74) *Attorney, Agent, or Firm* — Fish & Richardson P.C.

(57) ABSTRACT

A gamma voltage generation circuit includes a first resistor string that divides a high gamma reference voltage and low gamma reference voltage being input to output n (n: positive integer) gamma voltages; a plurality of buffers to transfer the n gamma voltages output from the first resistor string; and a second resistor string that divides a plurality of gamma voltages transferred from the plurality of buffers to output overall grayscale-specific gamma compensation voltages.

16 Claims, 14 Drawing Sheets

GAMMA VOLTAGE GENERATION CIRCUIT AND DISPLAY DEVICE INCLUDING SAME

CROSS-REFERENCE TO RELATED APPLICATION

This application claims the priority of Korean Patent Application No. 10-2023-0195313, filed on Dec. 28, 2023, which is hereby incorporated by reference in its entirety.

BACKGROUND

Field of the Disclosure

The present disclosure relates to a gamma voltage generation circuit and a display device including the same.

Description of the Background

Electroluminescent display devices are divided into inorganic light emitting display devices and organic light emitting display devices according to a material of a light emitting layer. An active-matrix type organic light emitting display device includes an organic light emitting diode (hereinafter referred to as an "OLED") which emits light by itself, and has advantages in that a response speed is fast and luminous efficiency, luminance, and a viewing angle are large.

In organic light-emitting display devices, organic light-emitting diodes (referred to as "OLEDs") are formed in each of pixels. These organic light display devices not only respond quickly and have excellent light-emitting efficiency, luminance, and viewing angle, but also have excellent contrast ratio and color reproduction rate because they may express black tones as complete black.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like.

SUMMARY

At this time, the data driver is integrated with multiple driver integrated circuits (ICs), and each driver IC receives a gamma reference voltage generated from the gamma voltage generation circuit. However, since the gamma reference voltage should be generated for each color, the driver IC where the gamma reference voltage is input requires many pins and lines. Therefore, a design method to reduce the number of pins and lines of the driver IC is required.

The present disclosure is directed to solving all the above-described necessity and problems.

More specifically, the present disclosure provides a gamma voltage generation circuit and a display device including the same.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a gamma voltage generation circuit includes a first resistor string that divides a high gamma reference voltage and low gamma reference voltage being input to output n (n: positive integer) gamma voltages; a plurality of buffers to transfer the n gamma voltages output from the first resistor string; and a second resistor string that divides a plurality of gamma voltages transferred from the plurality of buffers to output overall grayscale-specific gamma compensation voltages.

A display device according to aspects of the present disclosure may include a display panel on which data lines, gate lines crossing the data lines, and pixels are arranged; a gamma voltage generation circuit configured to output overall grayscale-specific gamma compensation voltages; and a data driver that is configured to generate a data voltage by converting pixel data of an input image into the overall grayscale-specific gamma compensation voltages, and output the data voltage to the data lines, wherein the gamma voltage generation circuit includes a first resistor string that divides a high gamma reference voltage and low gamma reference voltage being input to output n (n: positive integer) gamma voltages, a plurality of buffers to transfer the n gamma voltages output from the first resistor string, and a second resistor string that divides a plurality of gamma voltages transferred from the plurality of buffers to output the overall grayscale-specific gamma compensation voltages.

According to the present disclosure, it is possible to implement a gamma voltage generation circuit with a simple structure by generating a gamma voltage (or gamma tap voltage) and dividing the gamma voltage using a resistor string (R string) to generate a gamma compensation voltage for each grayscale.

According to the present disclosure, since the structure of the gamma voltage generation circuit is simple, it is possible to reduce the number of pins and lines of a number of driver ICs to which the gamma reference voltage is supplied as well as circuits, and it is also possible to secure as much space as the reduced size at this time.

According to the present disclosure, the number of pins and lines of a number of driver ICs as well as circuits may be reduced, thereby reducing manufacturing costs.

According to the present disclosure, the structure of the gamma voltage generation circuit may be simple, so low-power operation may be possible.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which.

DETAILED DESCRIPTION

Figure 1:
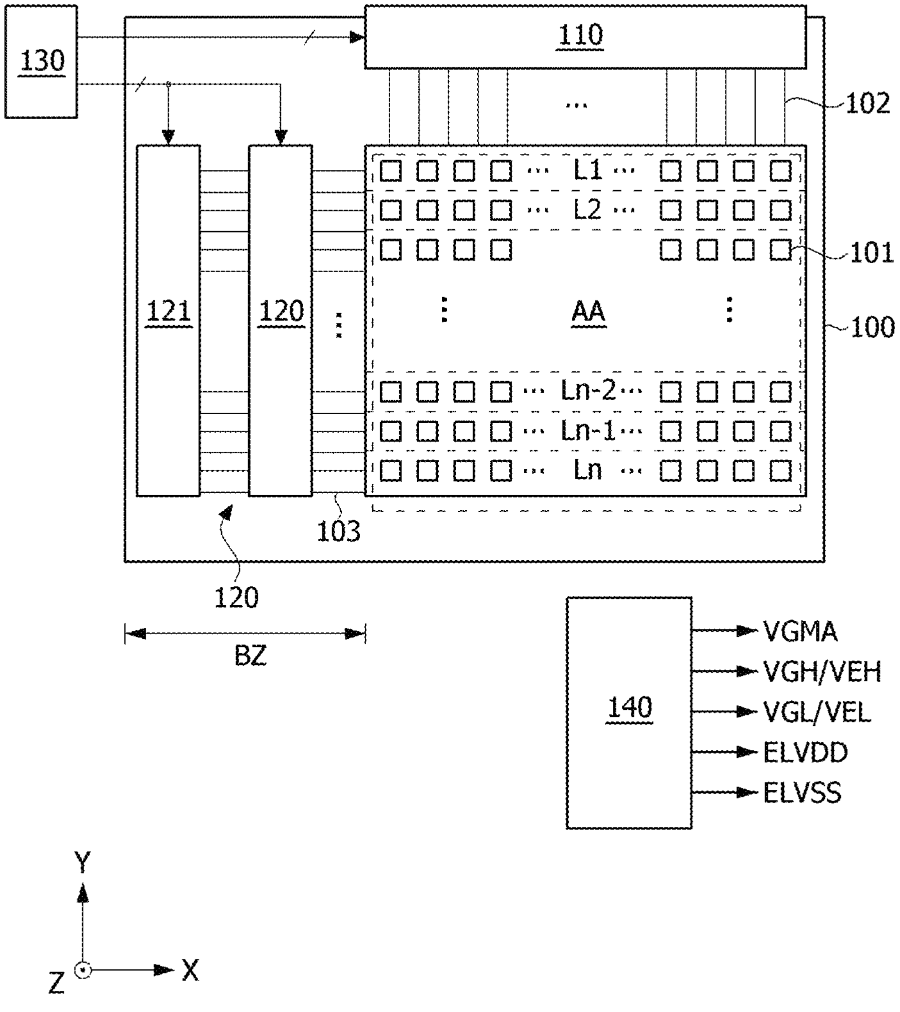
FIG. 1 is a block diagram illustrating a display device according to an aspect of the present disclosure.

Advantages and features of the present disclosure and methods of achieving them will become apparent with reference to various aspects, which are described in detail, in conjunction with the accompanying drawings. However, the present disclosure is not limited to the aspects to be described below and may be implemented in different forms, the aspects are only provided to completely disclose the present disclosure and completely convey the scope of the present disclosure to those skilled in the art, and the present disclosure is defined by the disclosed claims.

Since the shapes, sizes, proportions, angles, numbers, and the like disclosed in the drawings for describing the aspects of the present disclosure are only exemplary, the present disclosure is not limited to the illustrated items. The same reference numerals indicate the same components throughout the disclosure. Further, in describing the present disclosure, when it is determined that a detailed description of related known technology may unnecessarily obscure the gist of the present disclosure, the detailed description thereof will be omitted.

When 'including,' 'having,' 'consisting,' and the like mentioned in the present disclosure are used, other parts may be added unless 'only' is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as 'on,' 'at an upper portion,' 'at a lower portion,' 'next to, and the like, one or more other parts may be located between the two parts unless 'immediately' or 'directly' is used.

Although first, second, and the like are used to describe various components, these components are not limited by these terms. These terms are only used to distinguish one component from another. Accordingly, a first component, which is mentioned, below may also be a second component within the technical spirit of the present disclosure.

The same reference numerals may refer to substantially the same elements throughout the present disclosure.

The following aspects may be partially or entirely bonded to or combined with each other and may be linked and operated in technically various ways. The aspects may be carried out independently of or in association with each other.

Hereinafter, various aspects of the present disclosure will be described in detail with reference to the accompanying drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

Figure 2:
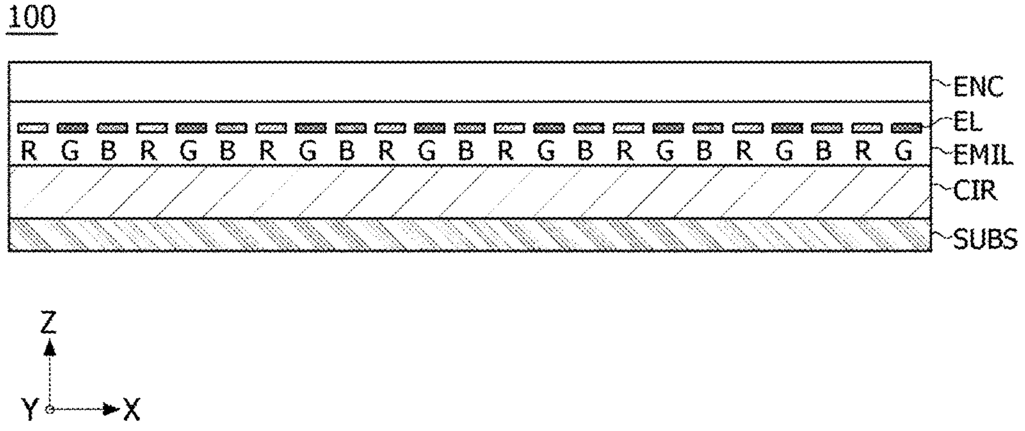
FIG. 2 is a cross-sectional view illustrating a cross-sectional structure of the display panel shown in FIG. 1.

FIG. 1 is a block diagram illustrating a display device according to one aspect of the present disclosure, and FIG. 2 is a cross-sectional view illustrating a cross-sectional structure of the display panel shown in FIG. 1.

Referring to FIGS. 1 and 2, a display device according to an aspect of the present disclosure includes a display panel 100, a display panel driving unit configured to write pixel data to pixels of the display panel 100, and a power supply unit 140 configured to generate power required for driving the pixels and the display panel driving unit.

The display panel 100 includes a pixel array AA that displays an input image. The pixel array AA includes a plurality of data lines 102, a plurality of gate lines 103 intersected with the data lines 102, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines 103. Sub-pixels arranged in a column direction Y along a data line direction share the same data line 102. One horizontal period 1H is a time obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin Polyimide (PI) film substrate. A multi-layered buffer film may be formed of an insulating material (not shown) on the organic thin film. Lines may be formed on the organic thin film to supply power or signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 includes a pixel circuit. The pixel circuit is connected to the data line 102 and the gate line 103.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a thin-film transistor (TFT) array including a pixel circuit connected to wirings such as a data line, a gate line, a power line, and the like, and a gate driver 410 and 420. The circuit layer CIR includes a plurality of metal layers insulated with insulating layers interposed therebetween, and a semiconductor material layer. All transistors formed in the circuit layer CIR may be implemented as n-channel oxide TFTs.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply unit 140 generates direct current (DC) power necessary to drive the display panel driving unit and the pixel array of the display panel 100 by using a DC-DC converter. The DC-DC converter may include a charge pump, a regulator, a buck converter, a boost converter, and the like. The power supply unit 140 may adjust a level of an input DC voltage applied from a host system (not shown) to generate constant voltages (or DC voltages) such as a gamma reference voltage VGMA, gate-on voltages VGH and VEH, gate-off voltages VGL and VEL, the pixel driving voltage EVDD, the low-potential power voltage EVSS, the initialization voltage VINIT, and the reference voltage VREF. The gamma reference voltage VGMA is supplied to a data driver 110. The gate-on voltages VGH and VEH and the gate-off voltages VGL and VEL are supplied to a gate driver 120. The constant voltages such as the pixel driving voltage EVDD, the low-potential power voltage EVSS, the initialization voltage VINIT, and the reference voltage VREF may be supplied to the pixels 101 through the power lines commonly connected to the pixels 101.

The power supply 140 may generate color-specific gamma reference voltages VGMA_REFH and VGMA_REFL. The color-specific gamma reference voltages may include, for example, red high gamma reference voltage, red low gamma reference voltage, green high gamma reference voltage, green low gamma reference voltage, blue high gamma reference voltage, and blue low gamma reference voltage.

The display panel driving unit writes pixel data of an input image to the pixels of the display panel 100 under control of a timing controller (TCON) 130.

The display panel driving unit includes the data drivers 110 and the gate drivers 130.

A de-multiplexer (DEMUX) may be disposed between the data driver 110 and the data lines 102. The de-multiplexer is omitted from FIG. 1. The de-multiplexer sequentially connects one channel of the data driver 110 to the plurality of data lines 102 and distributes in a time division manner the data voltage outputted from one channel of the data driver 110 to the data lines 102, thereby reducing the number of channels of the data driver 110.

The display panel driving circuit may further include a touch sensor driver for driving the touch sensors. The touch sensor driver is omitted from FIG. 1. In a mobile device, the timing controller 130, the power supply unit 140, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer in each of the channels of the data driver 110.

In the data driver 110, the output buffer included in one channel may be connected to adjacent data lines 102 through the de-multiplexer array 112 (not shown). The de-multiplexer array 112 may be formed directly on the substrate of the display panel 100 or integrated into one drive IC together with the data driver 110.

The gate driver 120 may be implemented as a gate in panel (GIP) circuit formed directly on a bezel BZ area of the display panel 100 together with the TFT array of the pixel array AA. The gate driver 120 sequentially outputs gate signals to the gate lines 103 under the control of the timing controller 130. The gate driver 120 may sequentially supply the gate signals to the gate lines 103 by shifting the gate signals using a shift register.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period may be known by counting the data enable signal DE, the vertical synchronization signal Vsync and the horizontal synchronization signal Hsync may be omitted. The data enable signal DE has a cycle of one horizontal period (1H).

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low level voltage of the gate timing control signal into the gate-off voltages VGL and VEL and converts a high level voltage of the gate timing control signal into the gate-on voltages VGH and VEH. The gate timing signal includes the start pulse and the shift clock.

The host system may include a main board of one of a television system, a set-top box, a navigation system, a personal computer (PC), a home theater system, a vehicle system, and a mobile device system. In this case, the data driver 110, the gate driver 120, the timing controller 130, and the like may be integrated into one drive IC (DIC) in mobile devices or wearable devices.

Figure 3:
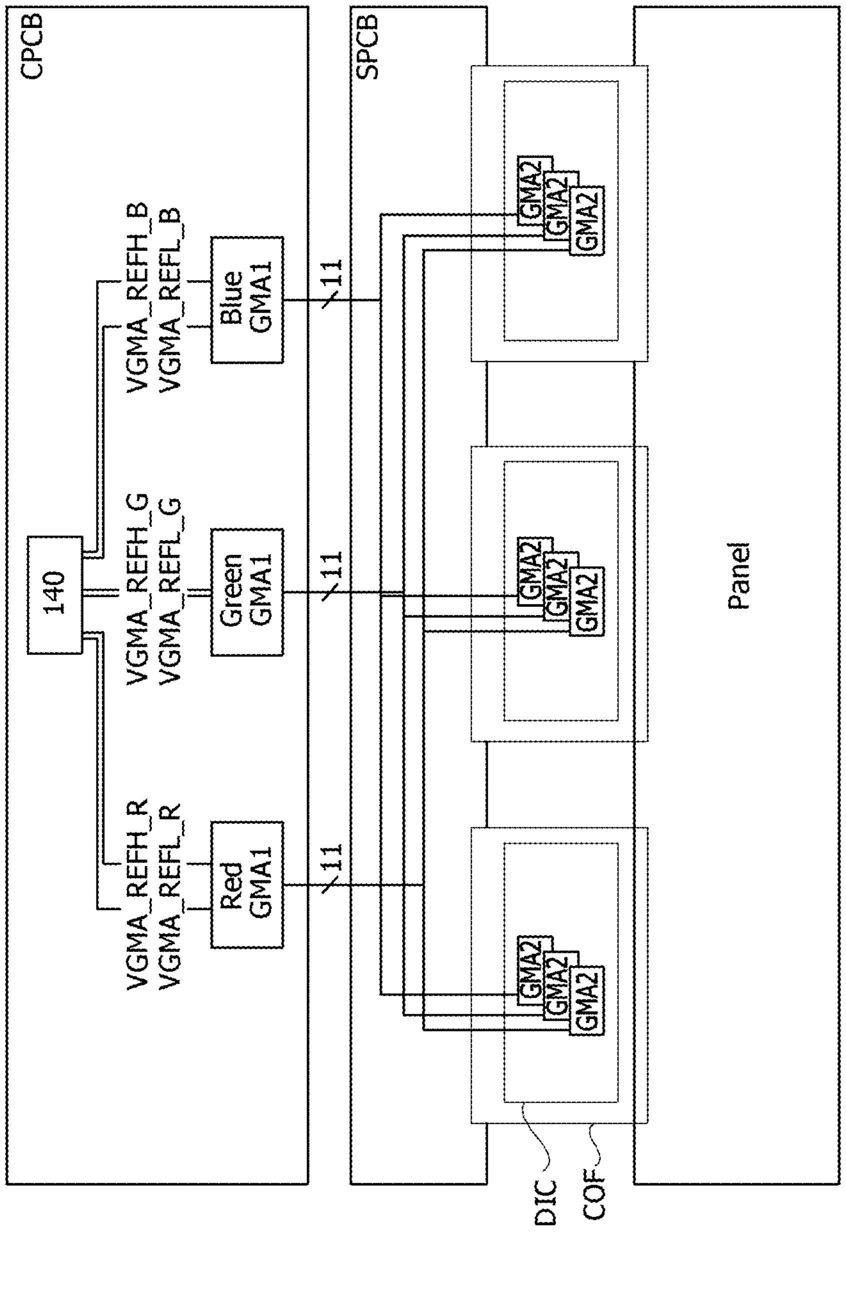
FIGS. 3 and 4 are diagrams for comparing and describing gamma voltage generation circuits according to comparative examples.
Figure 4:
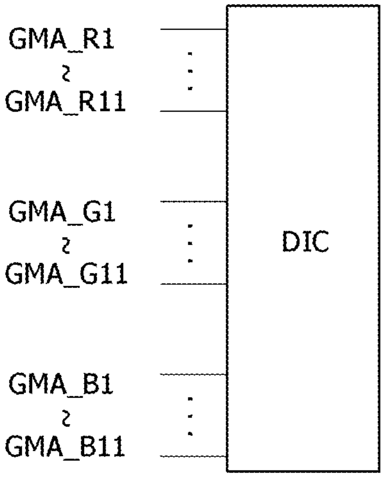

FIGS. 3 and 4 are diagrams for comparing and describing gamma voltage generation circuits according to comparative examples.

With reference to FIGS. 3 and 4, the gamma voltage generation circuit according to a comparative example may include a first gamma block GMA1 and a second gamma block GMA2. The first gamma block GMA1 is disposed on the control PCB (CPCB), and the second gamma block GMA2 is disposed on the drive IC (DIC).

The first gamma block (GMA1) may receive a high gamma reference voltage and a low gamma reference voltage from the power supply, and output a plurality of gamma voltages by using the received high gamma reference voltage and low gamma reference voltage. Here, the gamma voltages are eleven (11) voltages with different voltage levels.

The second gamma block GMA2 may receive 11 gamma voltages as input from the first gamma block GMA1, and output gamma compensation voltages for all grayscales by using the received 11 gamma voltages.

If the first gamma block GMA1 transfers 11 gamma voltages to the second gamma block GMA2, as 11 lines are required for each color, a total of 33 lines are required. Hence, the drive IC where the second gamma block is disposed requires 33 pins.

The gamma voltage generation circuit according to the comparative example not only requires a gamma block in each of the CPCB and the drive IC, but also requires many lines and pins to transmit the gamma voltages between the two gamma blocks. To solve this problem, the gamma voltage generation circuit may be disposed on the drive IC, but in this case, the size of the drive IC becomes excessively large.

Therefore, aspects aim to propose a gamma voltage generation circuit with a simple structure. The gamma voltage generation circuit according to aspects generates a gamma voltage (or gamma tap voltage) and divides the gamma voltage by using a resistor string (R String) to generate gamma compensation voltages for all grayscales.

Figure 5:
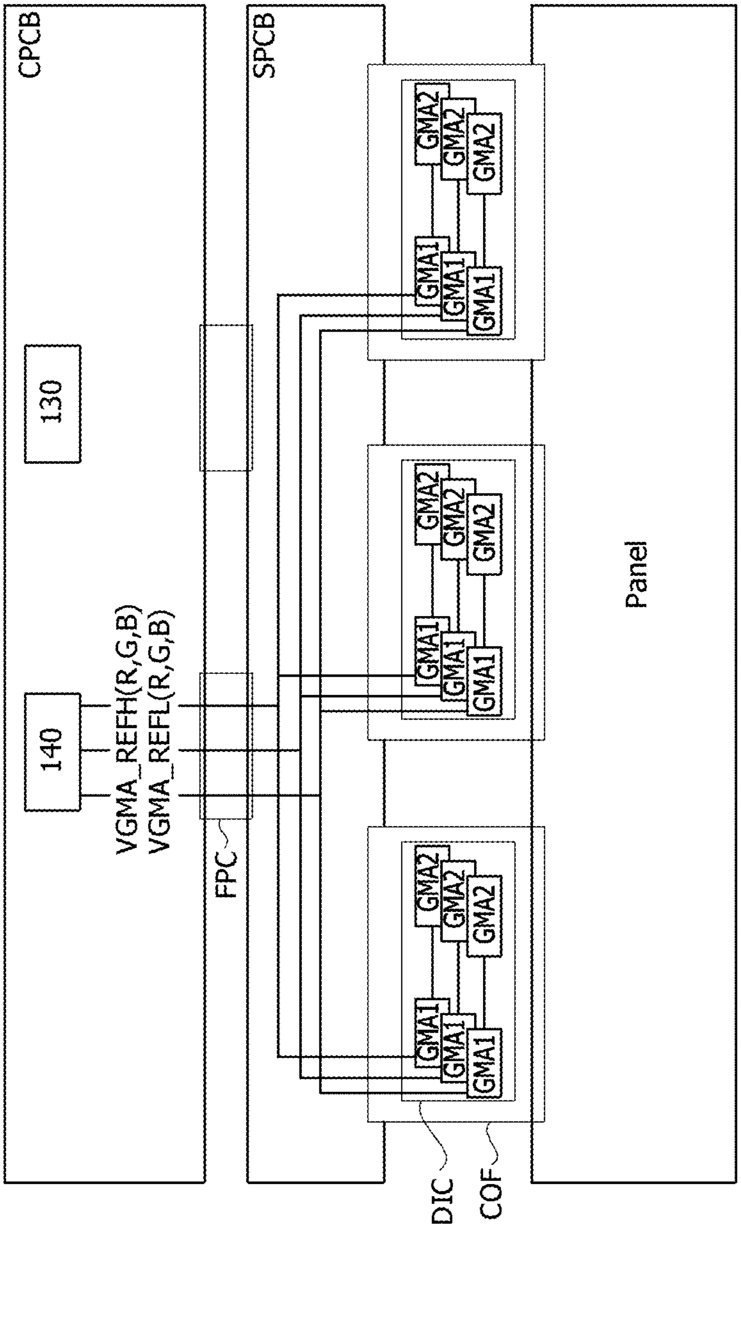
FIGS. 5 and 6 are diagrams illustrating a gamma voltage generation circuit according to an aspect of the present disclosure.
Figure 6:
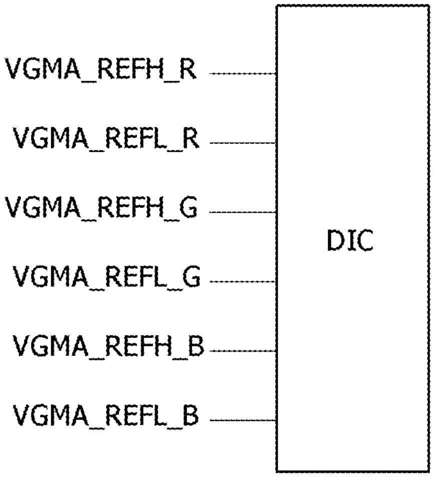
Figure 7:
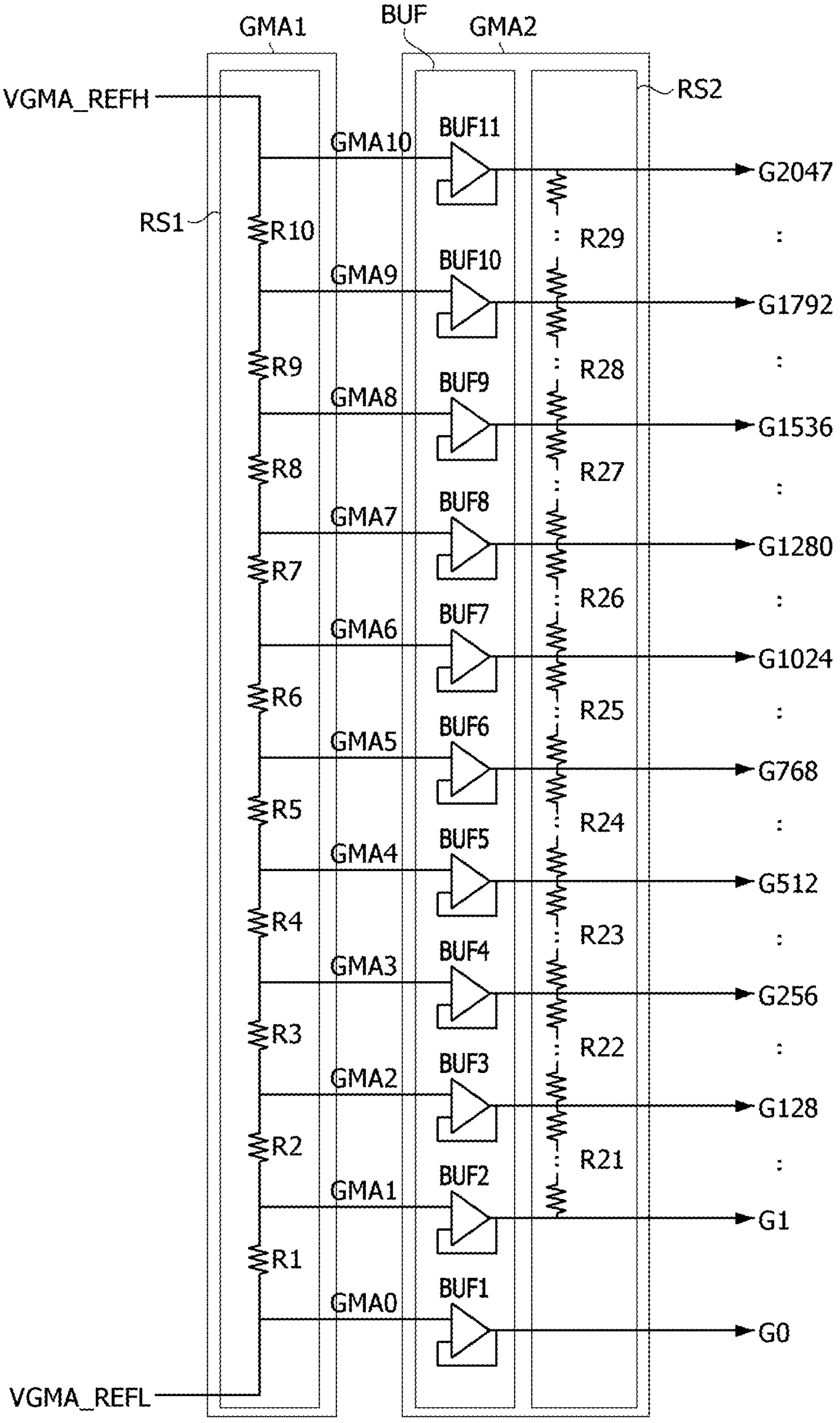
FIG. 7 is a diagram showing an example of implementing a gamma voltage generation circuit according to a first aspect of the present disclosure.
Figure 8:
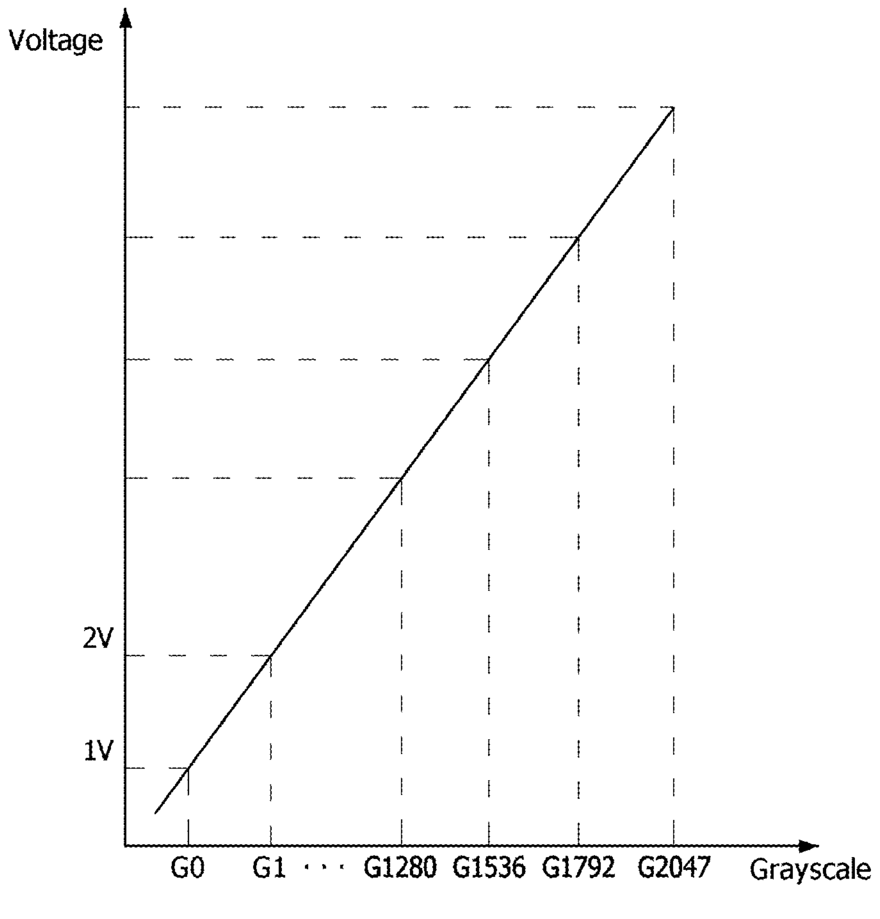
FIG. 8 is a diagram illustrating a gamma compensation voltage generated by the gamma voltage generation circuit shown in FIG. 7.

FIGS. 5 and 6 are diagrams illustrating a gamma voltage generation circuit according to an aspect of the present disclosure, FIG. 7 is a diagram showing an example of implementing a gamma voltage generation circuit according to a first aspect, and FIG. 8 is a diagram illustrating a gamma compensation voltage generated by the gamma voltage generation circuit shown in FIG. 7.

With reference to FIGS. 5 and 6, the gamma voltage generation circuit according to an aspect may include a first gamma block GMA1 and a second gamma block GMA2. The first gamma block GMA1 and the second gamma block GMA2 are disposed on the drive IC (DIC).

Since the first gamma block is not disposed on the control PCB (CPCB) or source PCB (SPCB) as in the comparative example of FIG. 4 but is disposed on the drive IC, the first gamma block receives six gamma reference voltages from the power supply, such as red high gamma reference voltage and red low gamma reference voltage, green high gamma reference voltage and green low gamma reference voltage, and blue high gamma reference voltage and blue low gamma reference voltage.

The timing controller 130 and power supply 140 may be mounted on the control PCB (CPCB). The control PCB (CPCB) may be connected to the source PCB (SPCB) through a flexible circuit film, for example, a flexible printed circuit (FPC). The color-specific gamma reference voltages output from the power supply 140 may be supplied to the drive IC via the FPC and the source PCB.

The gamma voltage generation circuit and the data driver 110 in FIG. 1 may be disposed on the drive IC (DIC). The gamma voltage generation circuit may output grayscale-specific gamma compensation voltages by using the gamma reference voltages output from the power supply and supply them to the data driver 110. The timing controller 130 provides pixel data of an input image received from the host system to the data driver 110. The data driver 110 converts pixel data (digital data) received from the timing controller 130 through the DAC into a gamma compensation voltage and outputs the data voltage. The data voltage output from the data driver 110 is output to the data lines through an output buffer connected to the data channel of the drive IC (DIC).

Therefore, in the aspect, only six lines are needed to transmit six gamma reference voltages.

With reference to FIG. 7, the first gamma block GMA1 according to the first aspect may include a first resistor string RS1 including resistors connected in series between a first power line to which the high gamma reference voltage VGMA_REFH is applied and a second power line to which the low gamma reference voltage VGMA_REFL is applied, and may divide the high gamma reference voltage VGMA_REFH and the low gamma reference voltage VGMA_REFL by using the first resistor string RS1 to output voltages with different voltage levels, that is, gamma voltages.

The first resistor string RS1 is divided into first to tenth voltage dividers R1 to R10. The first resistor string RS1 may receive the high gamma reference voltage VGMA_REFH and the low gamma reference voltage VGMA_REFL and utilize (n−1) voltage dividers, that is, the first to tenth voltage dividers R1 to R10 to output n (n is a positive integer) gamma voltages, that is, first to eleventh gamma voltages GAM1 to GMA11. Eleven gamma voltages are output through the nodes between the ten voltage dividers and the lines to which the high gamma reference voltage VGMA_REFH and the low gamma reference voltage VGMA_REFL are input, and the eleven output gamma voltages have linear values.

Each of the first to tenth voltage dividers R1 to R10 includes one resistor and has the same resistance value. The gamma voltage output from each node is defined as Equation 1 below.

[Equation 1]

$$GMA10 = REFH$$

$$GMA(k) = REFL + (REFH - REFL) \times \frac{\sum_{1}^{k} Rn}{\sum_{1}^{10} Rn},\ k = 1 \sim 9$$

$$GMA0 = REFL$$

Here, REFH=VGMA_REFH, REFL=VGMA_REFL. The first gamma reference voltage GMA0 is the lowest gamma reference voltage, and the eleventh gamma reference voltage GMA10 is the highest gamma reference voltage.

The second gamma block GMA2 may use the first to eleventh gamma voltages GAM0 to GMA10 output from the first gamma block GMA1 to output grayscale-specific gamma compensation voltages G0 to G2047 through voltage division.

The second gamma block GMA2 may include a buffer BUF and a second resistor string RS2.

The buffer BUF serves to stably maintain the first to eleventh gamma voltages GAM0 to GMA10 output from the first gamma block GMA1. The buffer BUF may include first buffer BUF1, second buffer BUF2, third buffer BUF3, fourth buffer BUF4, fifth buffer BUF5, sixth buffer BUF6, seventh buffer BUF7, eighth buffer BUF8, ninth buffer BUF9, tenth buffer BUF10, and eleventh buffer BUF11.

The first buffer BUF1 outputs the first gamma voltage GMA0 as a grayscale-specific gamma compensation voltage. The second buffer BUF2 outputs the second gamma voltage GMA1 as a grayscale-specific gamma compensation voltage. The third buffer BUF3 supplies the third gamma voltage GMA2 to the node between the $21^{st}$ voltage divider R21 and the $22^{nd}$ voltage divider R22. The fourth buffer BUF4 supplies the fourth gamma voltage GMA3 to the node between the $22^{nd}$ voltage divider R22 and the $23^{rd}$ voltage divider R23. The fifth buffer BUF5 supplies the fifth gamma voltage GMA4 to the node between the $23^{rd}$ voltage divider R23 and the $24^{th}$ voltage divider R24. The sixth buffer BUF6 supplies the sixth gamma voltage GMA5 to the node between the $24^{th}$ voltage divider R24 and the $25^{th}$ voltage divider R25. The seventh buffer BUF7 supplies the seventh gamma voltage GMA6 to the node between the $25^{th}$ voltage divider R25 and the $26^{th}$ voltage divider R26. The eighth buffer BUF8 supplies the eighth gamma voltage GMA7 to the node between the $26^{th}$ voltage divider R26 and the $27^{th}$ voltage divider R27. The ninth buffer BUF9 supplies the ninth gamma voltage GMA8 to the node between the $27^{th}$ voltage divider R27 and the $28^{th}$ voltage divider R28. The tenth buffer BUF10 supplies the tenth gamma voltage GMA9 to the node between the $28^{th}$ voltage divider R28 and the $29^{th}$ voltage divider R29. The eleventh buffer BUF11 outputs the eleventh gamma voltage GMA10 as a grayscale-specific gamma compensation voltage.

The second resistor string RS2 is divided into (n−2) $21^{st}$ to $29^{th}$ voltage dividers R21 to R29.

The $21^{st}$ voltage divider R21 divides the second gamma voltage GMA1 and the third gamma voltage GMA2 to output grayscale-specific gamma compensation voltages between the second gamma voltage GMA1 and the third gamma voltage GMA2. The $22^{nd}$ voltage divider R22 divides the third gamma voltage GMA2 and the fourth gamma voltage GMA3 to output grayscale-specific gamma compensation voltages between the third gamma voltage GMA2 and the fourth gamma voltage GMA3. The $23^{rd}$ voltage divider R23 divides the fourth gamma voltage GMA3 and the fifth gamma voltage GMA4 to output grayscale-specific gamma compensation voltages between the fourth gamma voltage GMA3 and the fifth gamma voltage GMA4. The $24^{th}$ voltage divider R24 divides the fifth gamma voltage GMA4 and the sixth gamma voltage GMA5 to output grayscale-specific gamma compensation voltages between the fifth gamma voltage GMA4 and the sixth gamma voltage GMA5. The $25^{th}$ divider R25 divides the sixth gamma voltage GMA5 and the seventh gamma voltage GMA6 to output grayscale-specific gamma compensation voltages between the sixth gamma voltage GMA5 and the seventh gamma voltage GMA6. The $26^{th}$ voltage divider R26 divides the seventh gamma voltage GMA6 and the eighth gamma voltage GMA7 to output grayscale-specific gamma compensation voltages between the seventh gamma voltage GMA6 and the eighth gamma voltage GMA7. The 27th voltage divider R27 divides the eighth gamma voltage GMA7 and the ninth gamma voltage GMA8 to output grayscale-specific gamma compensation voltages between the eighth gamma voltage GMA7 and the ninth gamma voltage GMA8. The 28th voltage divider R28 divides the ninth gamma voltage GMA8 and the tenth gamma voltage GMA9 to output grayscale-specific gamma compensation voltages between the ninth gamma voltage GMA8 and the tenth gamma voltage GMA9. The 29th voltage divider R29 divides the tenth gamma voltage GMA9 and the eleventh gamma voltage GMA10 to output grayscale-specific gamma compensation voltages between the tenth gamma voltage GMA9 and the eleventh gamma voltage GMA10.

The grayscale-specific gamma compensation voltages may be linearly divided voltage values as shown in FIG. 8.

Figure 9:
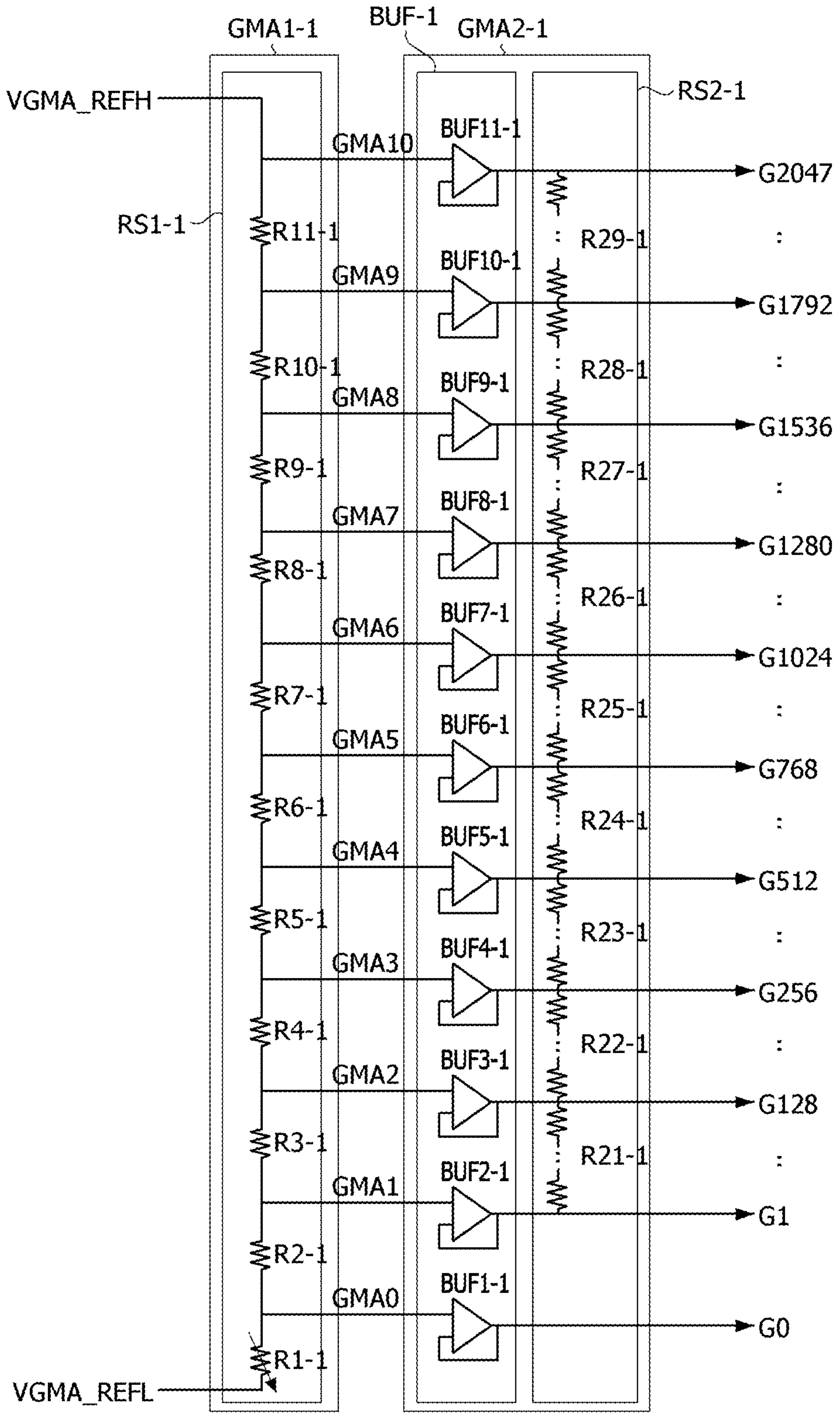
FIG. 9 is a diagram showing an example of implementing a gamma voltage generation circuit according to a second aspect of the present disclosure.
Figure 10A:
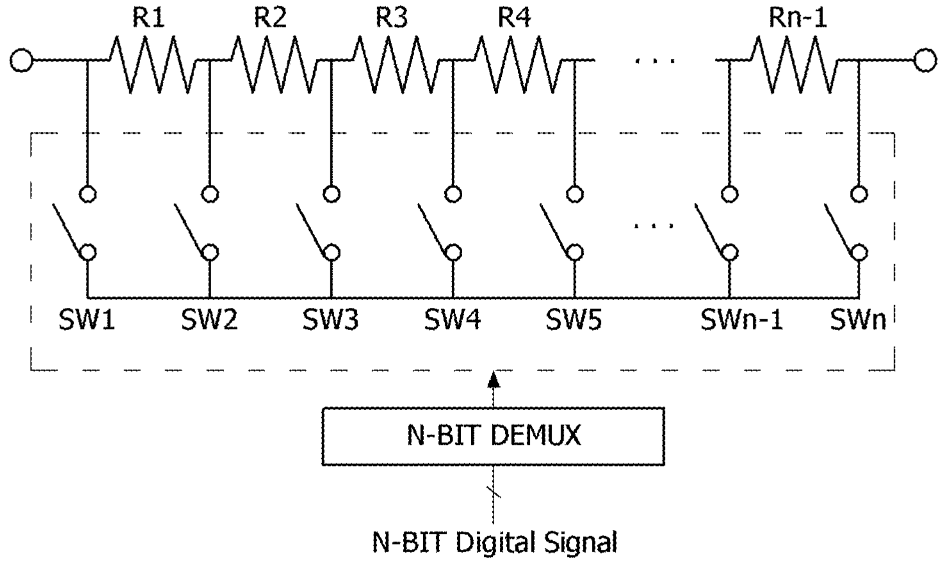
FIGS. 10A and 10B are diagrams showing an example of the variable resistor shown in FIG. 9.
Figure 10B:
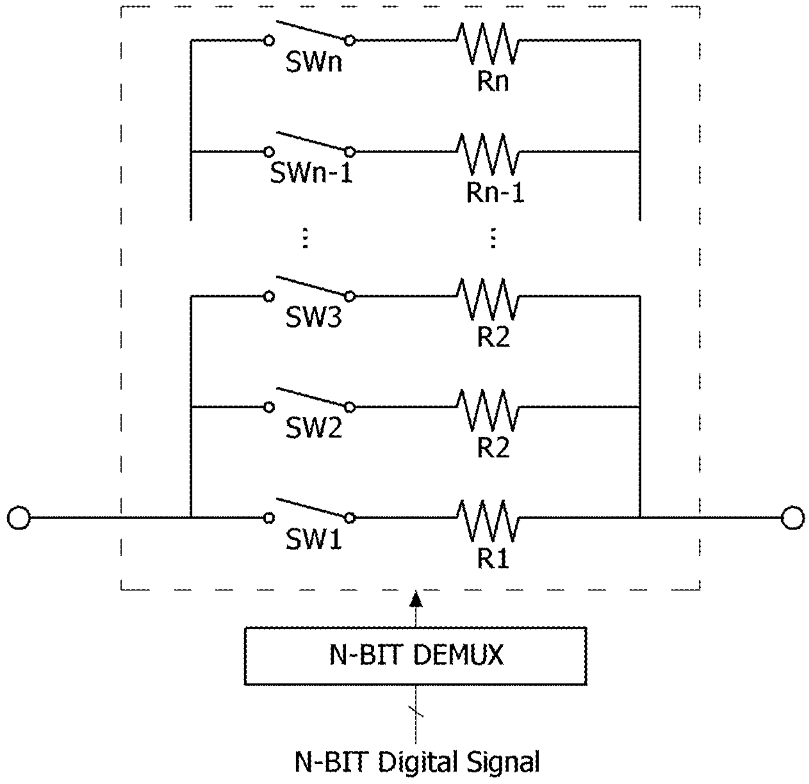
Figure 11:
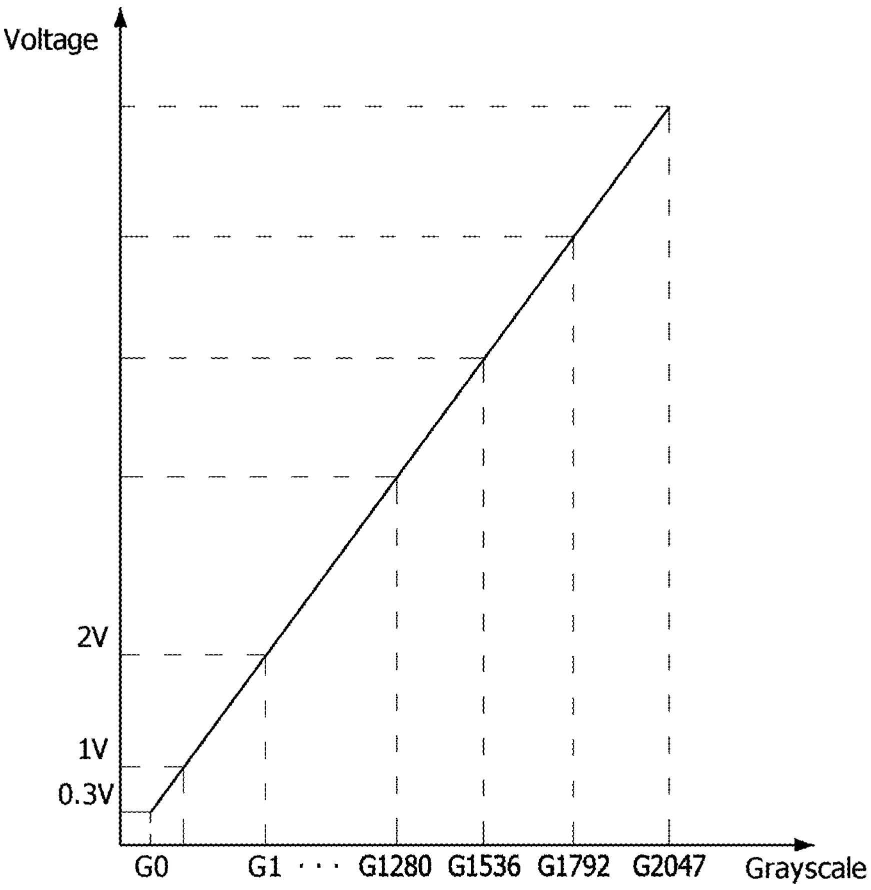
FIG. 11 is a diagram illustrating a gamma compensation voltage generated by the gamma voltage generation circuit shown in FIG. 9.

FIG. 9 is a diagram showing an example of implementing a gamma voltage generation circuit according to a second aspect, FIGS. 10A to 10B are diagrams showing an example of the variable resistor shown in FIG. 9, and FIG. 11 is a diagram illustrating a gamma compensation voltage generated by the gamma voltage generation circuit shown in FIG. 9.

With reference to FIGS. 9 and 10, the gamma voltage generation circuit according to the second aspect may include a first gamma block GMA1-1 and a second gamma block GMA2-1. The first gamma block GMA1-1 may include a first resistor string RS1-1 including resistors connected in series between the high gamma reference voltage VGMA_REFH and the low gamma reference voltage VGMA_REFL, and divide the high gamma reference voltage VGMA_REFH and the low gamma reference voltage VGMA_REFL by using the first resistor string RS1-1 to output voltages with different voltage levels, that is, gamma voltages.

The first resistor string RS1-1 is divided into n voltage dividers, that is, first to eleventh voltage dividers R1-1 to R11-1. The first resistor string RS1-1 may receive the high gamma reference voltage VGMA_REFH and the low gamma reference voltage VGMA_REFL, and use the first to eleventh voltage dividers R1-1 to R11-1 to output n gamma voltages, that is, first to eleventh gamma voltages GAM1 to GMA11. Eleven gamma voltages are output through the nodes between the eleven voltage dividers and the lines to which the high gamma reference voltage VGMA_REFH and the low gamma reference voltage VGMA_REFL are input, and the eleven output gamma voltages have linear values.

The first voltage divider R1-1 includes a variable resistor. Each of the second to eleventh voltage dividers R2-1 to RS11-1 includes one resistor and has the same resistance value. The variable resistor of the first voltage divider R1-1 has a value greater than that of the second to eleventh voltage dividers R2-1 to R11-1.

The gamma voltage output from each node is defined as Equation 2 below.

$$GMA10 = REFH$$

[Equation 2]

$$GMA(k-1) = REFL + (REFH - REFL) \times \frac{\sum_{1}^{k} Rn-1}{\sum_{1}^{11} Rn-1},\ k = 1 \sim 11$$

Here, REFH=VGMA_REFH, REFL=VGMA_REFL. The first gamma reference voltage GMA0 is the lowest gamma reference voltage, and the eleventh gamma reference voltage GMA10 is the highest gamma reference voltage.

With reference to FIGS. 10A and 10B, the variable resistor according to the aspect may be implemented with a digital potentiometer capable of changing the resistance value, but without being limited thereto.

As shown in FIG. 10A, the digital potentiometer includes a plurality of resistors R1 to Rn−1 connected in series, a plurality of switches SW1 to SWn connected between resistors, and a de-multiplexer DeMUX that controls the switches. The de-multiplexer DeMUX is an n-bit de-multiplexer that may receive an n-bit digital signal to turn on/off each of the n switches SW1 to SWn. The switches SW1 to SWn are placed at both ends of the resistors R1 to Rn−1, and connects a bypass path to deactivate the resistors in the on state and activates the resistors in the off state. The resistors R1 to Rn−1 are connected in series and are activated or deactivated depending on turning on/off of the switches SW1 to SWn. In this case, the resistors R1 to Rn−1 may have the same resistance value.

As shown in FIG. 10B, the digital potentiometer includes a plurality of resistors R1 to Rn−1 connected in parallel, a plurality of switches SW1 to SWn connected in series to the resistors, and a de-multiplexer DeMUX that controls the switches. The switches SW1 to SWn are connected in series to the resistors R1 to Rn−1, and activate the resistors in the on state and deactivate the resistors in the off state.

The second gamma block GMA2-1 may use the first to eleventh gamma voltages GAM0 to GMA10 output from the first gamma block GMA1-1 to output grayscale-specific gamma compensation voltages G0 to G2047 through voltage division.

The second gamma block GMA2-1 may include a buffer BUF-1 and a second resistor string RS2-1.

The buffer BUF-1 serves to stably maintain the first to eleventh gamma voltages GAM0 to GMA10 output from the first gamma block GMA1-1. The buffer (BUF-1) may include first buffer BUF1-1, second buffer BUF2-1, third buffer BUF3-1, fourth buffer BUF4-1, fifth buffer BUF5-1, sixth buffer BUF6-1, seventh buffer BUF7-1, eighth buffer BUF8-1, ninth buffer BUF9-1, tenth buffer BUF10-1, and eleventh buffer BUF11-1.

The first buffer BUF1-1 outputs the first gamma voltage GMA0 as a grayscale-specific gamma compensation voltage. The second buffer BUF2-1 outputs the second gamma voltage GMA1 as a grayscale-specific gamma compensation voltage. The third buffer BUF3-1 supplies the third gamma voltage GMA2 to the node between the 21st voltage divider R21-1 and the 22nd voltage divider R22-1. The fourth buffer BUF4-1 supplies the fourth gamma voltage GMA3 to the node between the 22nd voltage divider R22-1 and the 23rd voltage divider R23-1. The fifth buffer BUF5-1 supplies the fifth gamma voltage GMA4 to the node between the 23rd voltage divider R23-1 and the 24th voltage divider R24-1. The sixth buffer BUF6-1 supplies the sixth gamma voltage GMA5 to the node between the 24th voltage divider R24-1 and the 25th voltage divider R25-1. The seventh buffer BUF7-1 supplies the seventh gamma voltage GMA6 to the node between the 25th voltage divider R25-1 and the 26th voltage divider R26-1. The eighth buffer BUF8-1 supplies the eighth gamma voltage GMA7 to the node between the $26^{th}$ voltage divider R26-1 and the $27^{th}$ voltage divider R27-1. The ninth buffer BUF9-1 supplies the ninth gamma voltage GMA8 to the node between the $27^{th}$ voltage divider R27-1 and the $28^{th}$ voltage divider R28-1. The tenth buffer BUF10-1 supplies the tenth gamma voltage GMA9 to the node between the $28^{th}$ voltage divider R28-1 and the $29^{th}$ voltage divider R29-1. The eleventh buffer BUF11-1 outputs the eleventh gamma voltage GMA10 as a grayscale-specific gamma compensation voltage.

The second resistor string RS2-1 is divided into (n−2) $21^{st}$ to $29^{th}$ voltage dividers R21-1 to R29-1.

The $21^{st}$ voltage divider R21-1 divides the second gamma voltage GMA1 and the third gamma voltage GMA2 to output grayscale-specific gamma compensation voltages between the second gamma voltage GMA1 and the third gamma voltage GMA2. The $22^{nd}$ voltage divider R22-1 divides the third gamma voltage GMA2 and the fourth gamma voltage GMA3 to output grayscale-specific gamma compensation voltages between the third gamma voltage GMA2 and the fourth gamma voltage GMA3. The $23^{rd}$ voltage divider R23-1 divides the fourth gamma voltage GMA3 and the fifth gamma voltage GMA4 to output grayscale-specific gamma compensation voltages between the fourth gamma voltage GMA3 and the fifth gamma voltage GMA4. The $24^{th}$ voltage divider R24-1 divides the fifth gamma voltage GMA4 and the sixth gamma voltage GMA5 to output grayscale-specific gamma compensation voltages between the fifth gamma voltage GMA4 and the sixth gamma voltage GMA5. The $25^{th}$ voltage divider R25-1 divides the sixth gamma voltage GMA5 and the seventh gamma voltage GMA6 to output grayscale-specific gamma compensation voltages between the sixth gamma voltage GMA5 and the seventh gamma voltage GMA6. The $26^{th}$ voltage divider R26-1 divides the seventh gamma voltage GMA6 and the eighth gamma voltage GMA7 to output grayscale-specific gamma compensation voltages between the seventh gamma voltage GMA6 and the eighth gamma voltage GMA7. The $27^{th}$ voltage divider R27-1 divides the eighth gamma voltage GMA7 and the ninth gamma voltage GMA8 to output grayscale-specific gamma compensation voltages between the eighth gamma voltage GMA7 and the ninth gamma voltage GMA8. The $28^{th}$ voltage divider R28-1 divides the ninth gamma voltage GMA8 and the tenth gamma voltage GMA9 to output grayscale-specific gamma compensation voltages between the ninth gamma voltage GMA8 and the tenth gamma voltage GMA9. The $29^{th}$ voltage divider R29-1 divides the tenth gamma voltage GMA9 and the eleventh gamma voltage GMA10 to output grayscale-specific gamma compensation voltages between the tenth gamma voltage GMA9 and the eleventh gamma voltage GMA10.

Grayscale-specific gamma compensation voltages may be linearly divided voltage values as shown in FIG. 11, and the lowest gamma compensation voltage may be adjusted by using a variable resistor to be lower than that shown in FIG. 8.

For example, if a lower black data voltage should be used at a low grayscale, the gamma compensation voltage may be lowered from 1 V to 0.3 V by increasing the variable resistance of the first voltage divider R1-1.

Figure 12:
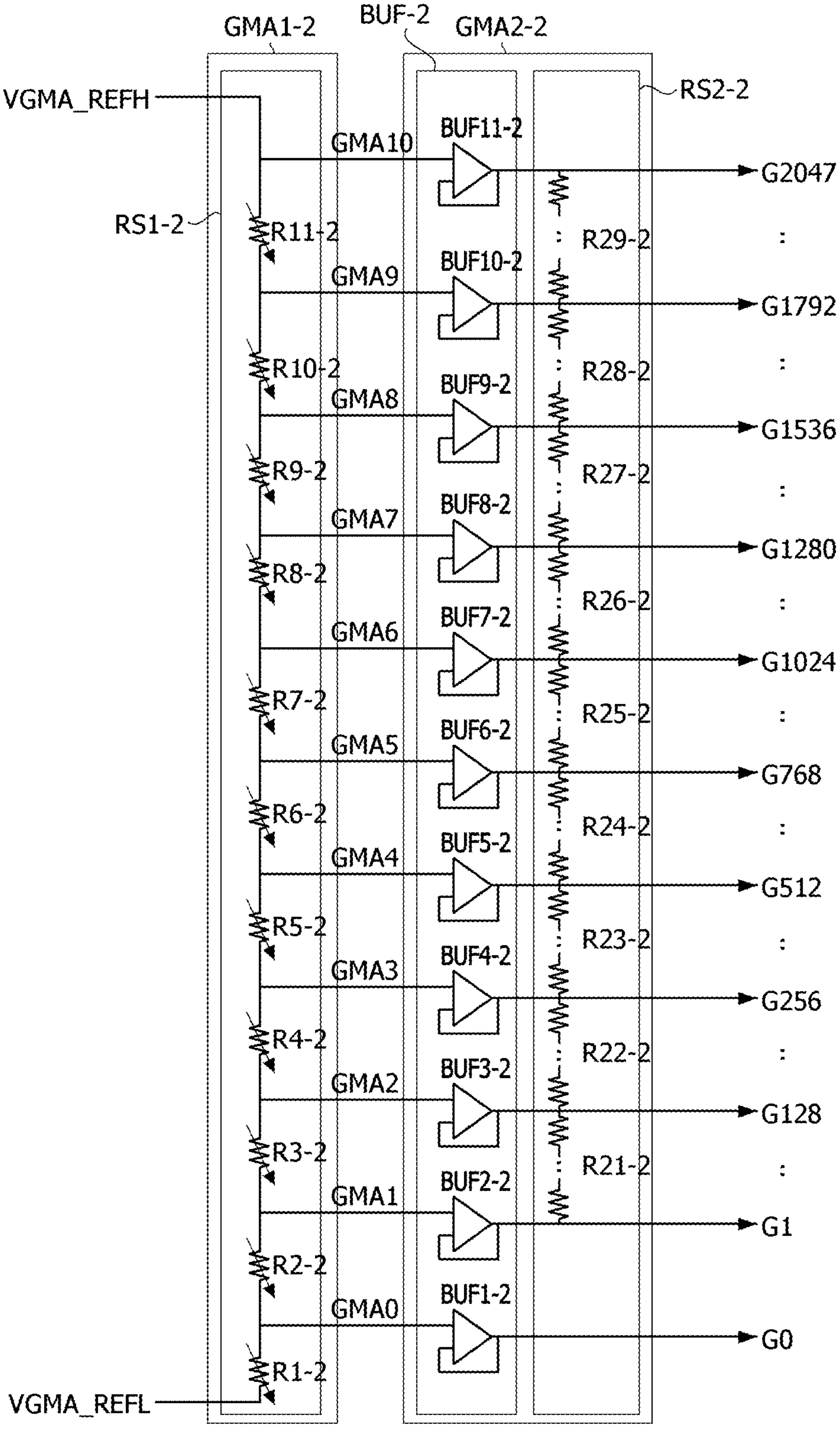
FIG. 12 is a diagram showing an example of implementing a gamma voltage generation circuit according to a third aspect of the present disclosure.
Figure 13:
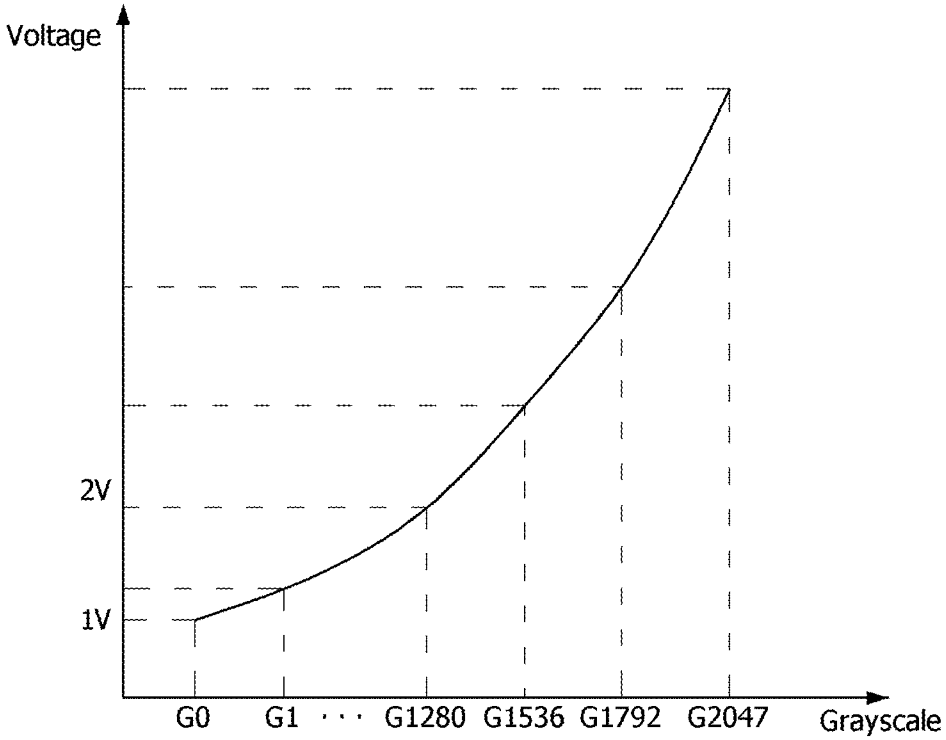
FIG. 13 is a diagram illustrating a gamma compensation voltage generated by the gamma voltage generation circuit shown in FIG. 12.

FIG. 12 is a diagram showing an example of implementing a gamma voltage generation circuit according to a third aspect, and FIG. 13 is a diagram illustrating a gamma compensation voltage generated by the gamma voltage generation circuit shown in FIG. 12.

With reference to FIGS. 12 and 13, the gamma voltage generation circuit according to the third aspect may include a first gamma block GMA1-2 and a second gamma block GMA2-2. The first gamma block GMA1-2 may include a first resistor string RS1-2 including resistors connected in series between the high gamma reference voltage VGMA_REFH and the low gamma reference voltage VGMA_REFL, and divide the high gamma reference voltage VGMA_REFH and the low gamma reference voltage VGMA_REFL by using the first resistor string RS1-2 to output voltages with different voltage levels, that is, gamma voltages.

The first resistor string RS1-2 is divided into n voltage dividers, that is, first to eleventh voltage dividers R1-2 to R11-2. The first resistor string RS1-2 may receive the high gamma reference voltage VGMA_REFH and the low gamma reference voltage VGMA_REFL, and use the first to eleventh voltage dividers R1-2 to R11-2 to output n gamma voltages, that is, first to eleventh gamma voltages GAM1 to GMA11. Eleven gamma voltages may be output through the nodes between the lines to which the high gamma reference voltage VGMA_REFH and the low gamma reference voltage VGMA_REFL are input and the eleven voltage dividers, and the eleven output gamma voltages may be formed to have linear values or non-linear values.

The first to eleventh voltage dividers R1-2 to R11-2 may each include one variable resistor. The gamma voltage output from each node is defined as Equation 3 below.

$$GMA10 = REFH \qquad \text{[Equation 3]}$$

$$GMA(k-1) = REFL + (REFH - REFL) \times \frac{\sum_{1}^{k} Rn-2}{\sum_{1}^{11} Rn-2},\ k = 1 \sim 11$$

Here, REFH=VGMA_REFH, REFL=VGMA_REFL. The first gamma reference voltage GMA0 is the lowest gamma reference voltage, and the eleventh gamma reference voltage GMA10 is the highest gamma reference voltage.

The second gamma block GMA2-2 may use the first to eleventh gamma voltages GMA0 to GMA10 output from the first gamma block GMA1-2 to output grayscale-specific gamma compensation voltages G0 to G2047 through voltage division.

The second gamma block GMA2-2 may include a buffer BUF-2 and a second resistor string RS2-2.

The buffer BUF-2 serves to stably maintain the first to eleventh gamma voltages GAM0 to GMA10 output from the first gamma block GMA1-2. The buffer BUF-2 may include first buffer BUF1-2, second buffer BUF2-2, third buffer BUF3-2, fourth buffer BUF4-2, fifth buffer BUF5-2, sixth buffer BUF6-2, seventh buffer BUF7-2, eighth buffer BUF8-2, ninth buffer BUF9-2, tenth buffer BUF10-2, and eleventh buffer BUF11-2.

The first buffer BUF1-2 outputs the first gamma voltage GMA0 as a grayscale-specific gamma compensation voltage. The second buffer BUF2-2 outputs the second gamma voltage GMA1 as a grayscale-specific gamma compensation voltage. The third buffer BUF3-2 supplies the third gamma voltage GMA2 to the node between the 21$^{st}$ voltage divider R21-2 and the 22$^{nd}$ voltage divider R22-2. The fourth buffer BUF4-2 supplies the fourth gamma voltage GMA3 to the node between the 22$^{nd}$ voltage divider R22-2 and the 23$^{rd}$ voltage divider R23-2. The fifth buffer BUF5-2 supplies the fifth gamma voltage GMA4 to the node between the 23$^{rd}$ voltage divider R23-2 and the 24$^{th}$ voltage divider R24-2. The sixth buffer BUF6-2 supplies the sixth gamma voltage GMA5 to the node between the 24$^{th}$ voltage divider R24-2 and the 25$^{th}$ voltage divider R25-2. The seventh buffer BUF7-2 supplies the seventh gamma voltage GMA6 to the node between the 25$^{th}$ voltage divider R25-2 and the 26$^{th}$ voltage divider R26-2. The eighth buffer BUF8-2 supplies the eighth gamma voltage GMA7 to the node between the 26$^{th}$ voltage divider R26-2 and the 27$^{th}$ voltage divider R27-2. The ninth buffer BUF9-2 supplies the ninth gamma voltage GMA8 to the node between the 27$^{th}$ voltage divider R27-2 and the 28$^{th}$ voltage divider R28-2. The tenth buffer BUF10-2 supplies the tenth gamma voltage GMA9 to the node between the 28$^{th}$ voltage divider R28-2 and the 29$^{th}$ voltage divider R29-2. The eleventh buffer BUF11-2 outputs the eleventh gamma voltage GMA10 as a grayscale-specific gamma compensation voltage.

The second resistor string RS2-2 is divided into (n−2) 21$^{st}$ to 29$^{th}$ voltage dividers R21-2 to R29-2.

The 21$^{st}$ voltage divider R21-2 divides the second gamma voltage GMA1 and the third gamma voltage GMA2 to output grayscale-specific gamma compensation voltages between the second gamma voltage GMA1 and the third gamma voltage GMA2. The 22$^{nd}$ voltage divider R22-2 divides the third gamma voltage GMA2 and the fourth gamma voltage GMA3 to output grayscale-specific gamma compensation voltages between the third gamma voltage GMA2 and the fourth gamma voltage GMA3. The 23$^{rd}$ voltage divider R23-2 divides the fourth gamma voltage GMA3 and the fifth gamma voltage GMA4 to output grayscale-specific gamma compensation voltages between the fourth gamma voltage GMA3 and the fifth gamma voltage GMA4. The 24$^{th}$ voltage divider R24-2 divides the fifth gamma voltage GMA4 and the sixth gamma voltage GMA5 to output grayscale-specific gamma compensation voltages between the fifth gamma voltage GMA4 and the sixth gamma voltage GMA5. The 25$^{th}$ voltage divider R25-2 divides the sixth gamma voltage GMA5 and the seventh gamma voltage GMA6 to output grayscale-specific gamma compensation voltages between the sixth gamma voltage GMA5 and the seventh gamma voltage GMA6. The 26$^{th}$ voltage divider R26-2 divides the seventh gamma voltage GMA6 and the eighth gamma voltage GMA7 to output grayscale-specific gamma compensation voltages between the seventh gamma voltage GMA6 and the eighth gamma voltage GMA7. The 27$^{th}$ voltage divider R27-2 divides the eighth gamma voltage GMA7 and the ninth gamma voltage GMA8 to output grayscale-specific gamma compensation voltages between the eighth gamma voltage GMA7 and the ninth gamma voltage GMA8. The 28$^{th}$ voltage divider R28-2 divides the ninth gamma voltage GMA8 and the tenth gamma voltage GMA9 to output grayscale-specific gamma compensation voltages between the ninth gamma voltage GMA8 and the tenth gamma voltage GMA9. The 29$^{th}$ voltage divider R29-2 divides the tenth gamma voltage GMA9 and the eleventh gamma voltage GMA10 to output grayscale-specific gamma compensation voltages between the tenth gamma voltage GMA9 and the eleventh gamma voltage GMA10.

The grayscale-specific gamma compensation voltages may be non-linearly divided voltage values as shown in FIG. 13, but without being limited thereto, and may be linearly divided voltage values for example. In this case, the grayscale-specific gamma compensation voltages may be voltage values, for example, on the gamma 2.2 curve. Here, FIG. 13 shows a gamma 2.2 curve, without being limited thereto.

Although the aspects of the present disclosure have been described in more detail with reference to the accompanying drawings, the present disclosure is not limited thereto and may be embodied in many different forms without departing from the technical concept of the present disclosure. Thus, it is intended that the present disclosure covers the modifications and variations of the aspects provided they come within the scope of the appended claims and their equivalents.

What is claimed is:

1. A gamma voltage generation circuit comprising:

a first resistor string that divides a high gamma reference voltage and low gamma reference voltage being input to output n (n: positive integer) gamma voltages;

a plurality of buffers configured to transfer the n gamma voltages output from the first resistor string; and a second resistor string that divides a plurality of gamma voltages transferred from the plurality of buffers to output overall grayscale-specific gamma compensation voltages, wherein the first resistor string includes (n−1) resistors that are connected in series between a first line to which the high gamma reference voltage is input and a second line to which the low gamma reference voltage is input; and wherein the (n−1) resistors are equal to each other and have fixed resistance values.

2. The gamma voltage generation circuit of claim 1, wherein the first resistor string receives the high gamma reference voltage and low gamma reference voltage generated from a power supply.

3. The gamma voltage generation circuit of claim 1, wherein the n gamma voltages have linearly arranged voltage values.

4. The gamma voltage generation circuit of claim 1, wherein the first resistor string further includes a variable resistor that is connected between the second line and one end of the (n−1) resistors to vary a gamma voltage of the lowest grayscale.

5. A gamma voltage generation circuit comprising:

a first resistor string that divides a high gamma reference voltage and low gamma reference voltage being input to output n (n: positive integer) gamma voltages;

a plurality of buffers configured to transfer the n gamma voltages output from the first resistor string; and a second resistor string that divides a plurality of gamma voltages transferred from the plurality of buffers to output overall grayscale-specific gamma compensation voltages, wherein the first resistor string includes n resistors that are connected in series between a first line to which the high gamma reference voltage is input and a second line to which the low gamma reference voltage is input; and wherein the n resistors are variable resistors that vary the n gamma voltages.

6. The gamma voltage generation circuit of claim 5, wherein the n gamma voltages are set linearly or non-linearly depending on resistance values of the variable resistors.

7. The gamma voltage generation circuit of claim 1, wherein the second resistor string includes (n−2) resistors that are connected in series between the lines through which (n−1) gamma voltages except for a gamma voltage of the lowest grayscale are output.

8. A display device comprising:

a display panel on which data lines, gate lines crossing the data lines, and pixels are arranged;

a gamma voltage generation circuit configured to output overall grayscale-specific gamma compensation voltages; and a data driver that is configured to generate a data voltage by converting pixel data of an input image into the overall grayscale-specific gamma compensation voltages, and output the data voltage to the data lines, wherein the gamma voltage generation circuit includes:

a first resistor string that divides a high gamma reference voltage and low gamma reference voltage being input to output n (n: positive integer) gamma voltages;

a plurality of buffers to transfer the n gamma voltages output from the first resistor string; and a second resistor string that divides a plurality of gamma voltages transferred from the plurality of buffers to output the overall grayscale-specific gamma compensation voltages, wherein the first resistor string includes (n−1) resistors that are connected in series between a first line to which the high gamma reference voltage is input and a second line to which the low gamma reference voltage is input; and wherein the (n−1) resistors are equal to each other and have fixed resistance value.

9. The display device of claim 8, wherein the gamma voltage generation circuit and the data driver are arranged on a drive IC.

10. The display device of claim 8, wherein the first resistor string receives the high gamma reference voltage and low gamma reference voltage generated from a power supply.

11. The display device of claim 10, wherein the gamma voltage generation circuit and the power supply are connected by two lines through which the high gamma reference voltage and the low gamma reference voltage are supplied, respectively.

12. The display device of claim 8, wherein the n gamma voltages have linearly arranged voltage values.

13. The display device of claim 8, wherein the first resistor string further includes a variable resistor that is connected between the second line and one end of the (n−1) resistors to vary a gamma voltage of the lowest grayscale.

14. A display device comprising:

a display panel on which data lines, gate lines crossing the data lines, and pixels are arranged;

a gamma voltage generation circuit configured to output overall grayscale-specific gamma compensation voltages; and a data driver that is configured to generate a data voltage by converting pixel data of an input image into the overall grayscale-specific gamma compensation voltages, and output the data voltage to the data lines, wherein the gamma voltage generation circuit includes:

a first resistor string that divides a high gamma reference voltage and low gamma reference voltage being input to output n (n: positive integer) gamma voltages;

a plurality of buffers to transfer the n gamma voltages output from the first resistor string; and a second resistor string that divides a plurality of gamma voltages transferred from the plurality of buffers to output the overall grayscale-specific gamma compensation voltages, wherein the first resistor string includes n resistors that are connected in series between a first line to which the high gamma reference voltage is input and a second line to which the low gamma reference voltage is input; and wherein the n resistors are variable resistors that vary the n gamma voltages.

15. The display device of claim 14, wherein the n gamma voltages are set linearly or non-linearly depending on resistance values of the variable resistors.

16. The display device of claim 8, wherein the second resistor string includes (n−2) resistors that are connected in series between the lines through which (n−1) gamma voltages except for a gamma voltage of the lowest grayscale are output.

* * * * *